April 25, 1961  J. STUART III  2,981,337
PROPELLER BLADE
Filed Sept. 8, 1959

INVENTOR.
JOSEPH STUART III
BY
ATTORNEYS

2,981,337
PROPELLER BLADE

Joseph Stuart III, Palo Alto, Calif., assignor, by mesne assignments, to Hiller Aircraft Corp., Palo Alto, Calif., a corporation of California Filed Sept. 8, 1959, Ser. No. 838,515

6 Claims. (Cl. 170—159)

This invention relates to propeller blades and, more particularly, to a propeller blade of extreme light weight construction.

For many types of aircraft, particularly those designed for vertical flight, it is desirable to provide light propeller blades to develop the necessary lift. The structural member must be formed of adequate cross section to resist the repeated flapwise and chordwise bending moments to which propeller blades are normally subjected. These bending moments are even more substantial in vertical flight aircraft, and the requirement of sectional strength coupled with the necessity for providing enough blade area to lift the aircraft tend to increase propeller blade weight. The resultant high centrifugal forces must be resisted by stronger propeller hubs and, hence, the weight of the propeller assembly is further increased. Obviously, in all aircraft and particularly those capable of vertical flight, weight is far more than a minor consideration.

It is, therefore, an object of this invention to provide a propeller blade of minimum weight with maximum resistivity to alternating bending moments.

It is a further object of this invention to provide a propeller, the weight of which is minimized by relieving the skin of bending stresses so that it can be formed of thin, light weight material.

It is a further object of this invention to provide a propeller that is simple to manufacture and efficient and reliable in operation.

A propeller embodying features of this invention would include a central tubular core of sufficient strength to resist chordwise and flapwise bending moments. Carried on the core by a load-distributing resilient bond is a plurality of airfoil segments with no rigid connection therebetween so that the joints between the segments of the propeller skin have sufficient flexibility to absorb bending moments which would otherwise be imposed on the airfoil segments. Further, because the attachment of the skin to the central core is itself flexible, there are virtually no stress concentrations in the core and the cross section thereof may be relatively uniform. Since the outer skin is required to withstand no bending moments its weight may be minimized by forming the segments of thin titanium or similar light material.

Other objects and advantages of the invention will become apparent from the specification following when read in connection with the accompanying drawings wherein.

Figure 1:
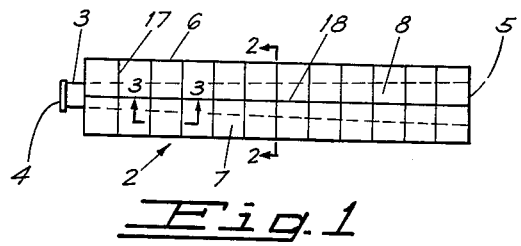
Fig. 1 is a plan view of a propeller embodying features of my invention.

Referring now to the drawings in particular, the propeller blade 2 of this invention includes a structural spar 3 having coupling means at its inboard end 4 for attachment thereof to a propeller hub. The spar 3 is formed as a tubular structural core or mandrel of a cross-sectional area designed to resist flapwise (transverse to the plane of the paper in Fig. 1) and chordwise (parallel to the plane of the paper) bending moments. The cross-sectional shape of the core 3 is circular at the inboard end 4 but assumes a gradiently flattening oval configuration toward the outboard portion or blade tip 5 in order to fit into the airfoil contour. Secured to and arranged along the core or mandrel 3 in order of progressively smaller minor axes to form a complete propeller blade is a plurality of airfoil sections 6, each comprising leading and trailing edge airfoil segments 7 and 8. Thus, the skin of each propeller blade is segmented both spanwise, between mating segments 7 and 8 of each section, and chordwise between each section 6.

Each segment or sector 7, 8 is supported on an arcuate liner 10a, 10b which, with the liner of its mating segment forms a split sleeve that conforms to and fits snugly over the portion of the mandrel 3 on which the airfoil section is to be secured as hereinafter described.

Secured to each half of the split sleeve liner is the skin sector 11a, 11b of thin, light material, such as sheet titanium, formed into a corresponding portion of the airfoil configuration so that the skin sectors carried on mating sleeve sectors will together present an airfoil contour. The skin sector may be secured to the sleeve or liner sector by any suitable means such as cement bonding or welding and strengthened by the provision of reinforcing transverse ribs 12a, 12b. The ribs are preferably of channel-like cross section and are bonded or welded to the skin and to the liner sector so that each segment 7 and 8 is a unitary structure comprising liner and skin segments unitized and strengthened by reinforcing ribs. Again the segments 7 and 8 are formed in pairs so that together they form a segmented complete airfoil section.

Figure 2:
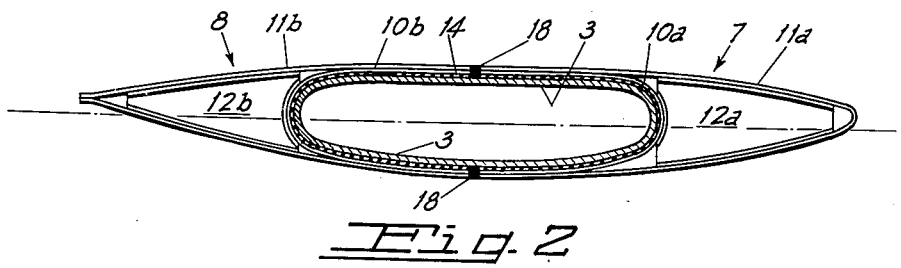
Fig. 2 is a section view taken along the line 2—2 of Fig. 1.
Figure 3:
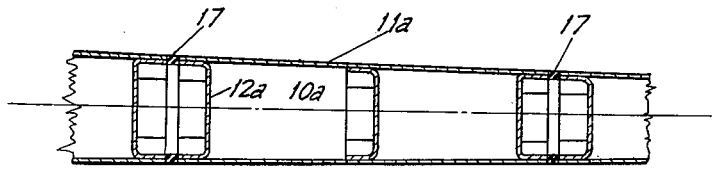
Fig. 3 is a section view taken along line 3—3 of Fig. 1.
Figure 4:
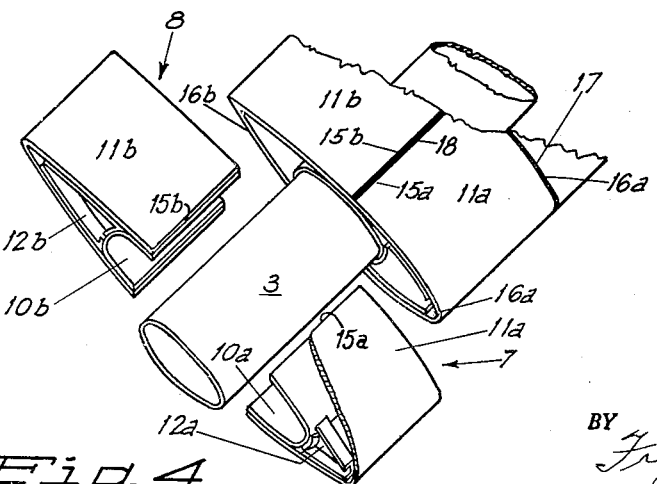
Fig. 4 is a partial isometric view of the propeller blade.

In construction of each propeller blade 2, the unitary airfoil segments 7 and 8 are placed over the structural core or mandrel 3 so that there is complete surface to surface contact between the liner sector 10a, 10b and the core 3. Then, the liner sector is bonded over its entire inner surface to the core by a layer 14 (Fig. 2) of a resilient and flexible bonding material such as rubber cement or the like. The elastic bonding material transmits bending and twisting forces asserted against the airfoil segment 7 or 8 and distributes them over the structural core 3. When the mating sectors 7 and 8 of an airfoil segment are bonded in place a small clearance space is left between the spanwise or lateral edges 15a, 15b of both the skin and liner segments. Similarly, each section is placed on the mandrel so that a small gap exists between the chordwise peripheral edges 16a, 16b of its segments and those of adjacent airfoil segments. Thus, each sector can be moved independently a limited extent in a spinwise or chordwise direction in response to bending moment without transmitting stress to adjacent sectors. Preferably the chordwise and spanwise gaps or clearances are filled and sealed by cushions or gaskets of rubber 17, 18 or other resilient material capable of absorbing such relative movement without transmitting it between sectors. When all segments are so mounted on the mandrel a complete propeller blade having a smooth, continuous airfoil contour from hub 4 to tip 5 over all airfoil sectors, is achieved. Since the resilient bond distributes the stresses, the mandrel need not be of particularly large cross section. Moreover, the airfoil skin sectors and segments are relieved of bending stresses and are required merely to transfer air loads and their own centrifugal force loads to the mandrel. Thus, extremely thin, light weight materials, such as titanium can be employed for the skin and thereby minimum weight requirements realized.

While a preferred embodiment of this invention has been described, it is apparent that modification and changes may be made thereto without departing from the spirit and scope of this invention which should be limited only by the claims appended hereto.

What is claimed as invention is:

1. A light weight propeller blade capable of withstanding repeated flapwise and chordwise bending loads applied thereto during use, comprising an elongated hollow tubular structural core, and a segmented airfoil skin resiliently bonded to said core and surrounding the same, said skin being segmented in both the flapwise and chordwise directions of said blade and comprising a plurality of discrete skin sections each of which comprises a pair of discrete contoured blade leading edge and trailing edge segments, each of said skin sections being spaced longitudinally from an adjacent skin section in the flapwise direction by a chordwise peripheral gap, the leading edge segment of each skin section being spaced from its associated trailing edge segment by longitudinally extending flapwise gaps on opposite sides of said structural core, and a strip of resilient cushioning material filling each of said peripheral and flapwise gaps and cooperating with said sections in providing a substantially smooth and continuous airfoil surface, each of said skin sections being resiliently bonded to said structural core by a layer of elastic, flexible bonding material, whereby said skin sections are resiliently spaced from said core and are movable relative thereto and relative to each other.

2. A light weight propeller blade capable of withstanding repeated flapwise and chordwise bending loads applied thereto during use, comprising an elongated hollow tubular structural core, and a segmented airfoil skin resiliently bonded to said core and surrounding the same, said skin being segmented in both the flapwise and chordwise directions of said blade and comprising a plurality of discrete skin sections each of which comprises a pair of discrete preformed light weight sheet metal contoured blade leading edge and trailing edge segments, each of said skin sections being spaced longitudinally from an adjacent skin section in the flapwise direction by a chordwise peripheral gap extending continuously around said structural core, the leading edge segment of each skin section being spaced from its associated trailing edge segment by longitudinally extending flapwise gaps on opposite sides of said structural core, a substantially annular strip of resilient cushioning material such as rubber filling each of said peripheral gaps, and a substantially straight strip of resilient cushioning material such as rubber filling each of said longitudinal flapwise gaps, each of said skin sections being resiliently bonded to said structural core by a layer of elastic, flexible bonding material, whereby said skin sections are resiliently spaced from said core and are movable relative thereto and to each other.

3. A light weight propeller blade capable of withstanding repeated flapwise and chordwise bending loads applied thereto during use, comprising an elongated hollow tubular structural core the cross-sectional shape of which varies from substantially circular to flattened oval from one end to the other thereof, and a segmented airfoil skin structure resiliently bonded to said core and surrounding the same, said skin structure being segmented in both the flapwise and chordwise directions and comprising a plurality of discrete skin sections, each of said sections comprising a pair of discrete contoured blade leading edge and trailing edge sheet metal segments each of which has a chordwise extending reinforcing rib secured therein, each of said skin sections being spaced longitudinally from an adjacent skin section in the flapwise direction by a chordwise peripheral gap, the leading edge segment of each skin section being spaced from its associated trailing edge segment by a longitudinally extending flapwise gap, and resilient cushioning means positioned in and filling said peripheral and flapwise gaps, each of said skin sections being resiliently bonded to said core by a layer of elastic, flexible bonding material whereby said skin sections are resiliently spaced from said core and movable relative thereto and relative to each other.

4. A light weight multi-piece propeller blade comprising an elongated hollow tubular structural core, and a segmented airfoil skin structure resiliently bonded to said core and surrounding the same, said skin structure being segmented in both the flapwise and chordwise directions and comprising a plurality of discrete skin sections each of which comprises a pair of discrete contoured blade leading edge and trailing edge segments; each of said segments comprising a generally U-shaped outer sheet metal sector, a generally U-shaped inner sleeve sector of smaller size than said outer sector secured thereto, and a reinforcing rib interposed between said inner and outer sectors and secured to each; each of said skin sections being spaced longitudinally from an adjacent skin section in the flapwise direction by a chordwise peripheral gap, the leading edge segment of each skin section being spaced from its associated trailing edge segment by a longitudinally extending flapwise gap, and a strip of resilient cushioning material filling each of said peripheral and flapwise gaps, each of said skin segments being resiliently bonded to said structural core by a layer of elastic, flexible bonding material interposed between said structural core and each of said inner sleeve sectors, whereby said airfoil skin structure is resiliently spaced from said core.

5. An airfoil member comprising an elongated rigid tubular mandrel, a plurality of liner sleeves positioned around said mandrel and conforming to the configuration thereof and arranged in longitudinally spaced relation along the length thereof; each of said liner sleeves comprising at least two sleeve sectors positioned on opposite sides of said mandrel, a layer of flexible and resilient bonding material interposed between each of said sleeve sectors and said mandrel securing said sectors to said mandrel; a plurality of airfoil surface sections each of which comprises a set of at least two mating airfoil segments, means securing each set of said mating airfoil segments to the sectors of an associated liner sleeve, the edges of the mating segments of each airfoil section being spaced from each other in the spanwise direction whereby spanwise gaps which extend longitudinally of said airfoil member are provided on opposite sides of said mandrel, the respective airfoil segments of said airfoil sections being arranged in spaced relationship relative to each other along said mandrel whereby a small peripheral gap is provided between adjacent airfoil sections.

6. The airfoil member defined in claim 5 which includes cushion strips of resilient material filling each of said peripheral and spanwise gaps whereby a smooth continuous airfoil surface is provided.

References Cited in the file of this patent
UNITED STATES PATENTS

| | | |
|---|---|---|
| 2,465,007 | Bragdon | Mar. 22, 1949 |
| 2,535,917 | Gruetjen | Dec. 26, 1950 |
| 2,606,728 | Sikorsky | Aug. 12, 1952 |
| 2,647,586 | Gruetjen | Aug. 4, 1953 |
| 2,690,810 | Doussain | Oct. 5, 1954 |

FOREIGN PATENTS

| | | |
|---|---|---|
| 311,050 | Germany | Feb. 24, 1919 |
| 1,009,798 | France | Mar. 12, 1952 |